US 12,242,566 B2

(12) United States Patent
Makhija et al.

(10) Patent No.: US 12,242,566 B2
(45) Date of Patent: *Mar. 4, 2025

(54) DATA LAKE AND SELF-DRIVEN SYSTEM FOR OPERATING ENTERPRISE AND SUPPLY CHAIN APPLICATIONS

(71) Applicant: NB Ventures, Inc., Clark, NJ (US)

(72) Inventors: Subhash Makhija, Westfield, NJ (US); Santosh Ganesh Dattatraya Bhat, Wadala East (IN); Huzaifa S Matawala, East Brunswick, NJ (US)

(73) Assignee: NB Ventures, Inc., Clark, NJ (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/091,522

(22) Filed: Dec. 30, 2022

(65) Prior Publication Data

US 2023/0214448 A1 Jul. 6, 2023

Related U.S. Application Data

(62) Division of application No. 16/288,513, filed on Feb. 28, 2019, now Pat. No. 11,687,617.

(51) Int. Cl.
| | |
|---|---|
| *G06Q 10/00* | (2023.01) |
| *G05B 13/02* | (2006.01) |
| *G05B 13/04* | (2006.01) |
| *G06F 17/18* | (2006.01) |
| *G06F 17/40* | (2006.01) |
| *G06F 18/20* | (2023.01) |
| *G06F 18/2411* | (2023.01) |

(Continued)

(52) U.S. Cl.
CPC .......... *G06F 17/40* (2013.01); *G05B 13/027* (2013.01); *G05B 13/04* (2013.01); *G06F 17/18* (2013.01); *G06F 18/20* (2023.01); *G06F 18/2411* (2023.01); *G06N 3/02* (2013.01); *G06N 3/049* (2013.01); *G06N 3/08* (2013.01); *G06N 20/00* (2019.01); *G06Q 10/0633* (2013.01); *G06Q 10/0637* (2013.01); *G06Q 10/0639* (2013.01)

(58) Field of Classification Search
CPC .............................. G06N 3/49; G06Q 10/063
See application file for complete search history.

(56) References Cited

U.S. PATENT DOCUMENTS

| | | | | |
|---|---|---|---|---|
| 2002/0178077 | A1* | 11/2002 | Katz ...................... | G06Q 10/10 |
| | | | | 705/7.36 |
| 2003/0033179 | A1* | 2/2003 | Katz .................. | G06Q 10/0631 |
| | | | | 705/7.41 |
| 2018/0191867 | A1* | 7/2018 | Siebel .................... | G06N 20/20 |

FOREIGN PATENT DOCUMENTS

WO WO-2018234741 A1 * 12/2018 ........... G06F 9/5072

OTHER PUBLICATIONS

Information Technology Systems in Logistics and roles of ERPs by Duma (Publication Date: 2012) (Year: 2012).*

* cited by examiner

*Primary Examiner* — Hafiz A Kassim
*Assistant Examiner* — Zahra Elkassabgi
(74) *Attorney, Agent, or Firm* — David M. Breiner; BrownWinick Law Firm

(57) ABSTRACT

The present invention provides self-driven Artificial Intelligence based system and method for operating one or more applications including enterprise application and supply chain management applications. The system includes centralized data lake for storing data received from plurality of distinct sources, a control tower configured for sensing change in attribute of the received data and determining impact of the change on plurality of functions of EA and SCM applications.

21 Claims, 12 Drawing Sheets

(51) Int. Cl.
*G06N 3/02* (2006.01)
*G06N 3/049* (2023.01)
*G06N 3/08* (2023.01)
*G06N 20/00* (2019.01)
*G06Q 10/0633* (2023.01)
*G06Q 10/0637* (2023.01)
*G06Q 10/0639* (2023.01)

DATA LAKE AND SELF-DRIVEN SYSTEM FOR OPERATING ENTERPRISE AND SUPPLY CHAIN APPLICATIONS

CROSS-REFERENCE TO RELATED APPLICATIONS

This application is a divisional application of U.S. patent application Ser. No. 16/288,513 which was filed with the United States Patent and Trademark Office on Feb. 28, 2019, the entire contents of which is herein incorporated by reference.

BACKGROUND

1. Technical Field

This disclosure relates generally to enterprise applications (EA) and supply chain management (SCM) applications. More particularly, this disclosure relates to self-driven system and methods of operating one or more applications including enterprise resource planning (ERP) and supply chain management (SCM) applications.

2. Description of the Prior Art

In any organization, enterprise applications (EA) and supply chain management (SCM) applications plays a very significant role in controlling various important functions. Such applications include various servers, databases, and computer-based systems for managing several internal and external aspects of an organization's enterprise level and supply chain level data management requirements. The requirements may be in areas such as finance, sales, logistics, asset, purchasing, and inventory, among others.

The existing enterprise application (EA) including enterprise Resource Planning (ERP) application systems that were built to optimize the resources within the walls of an enterprise, present various challenges. Connecting demand with the supply chain in a dynamically changing environment within enterprise resources planning is a big problem as the raw data depending on its characteristics and source is stored in silos. Working with such data of different types and characteristics along with other processes including extraction, cleansing of this silos data in real time is extremely cumbersome requiring technical modifications to the structural architecture of the existing ERP systems. Further, these data silos coupled with multitude of loosely coupled systems prevent real time collaboration among players such as customers, distributors, warehouses, factories, and suppliers.

Further, accuracy and storage of supply chain data flowing through existing application systems is a major concern, considering that such data gets dirty or outdated extremely quickly. For example, there is discrepancy between the entered lead time for suppliers and actual lead time of suppliers. The same is true for inventory. Further, the supplier names get duplicated, and a same supplier may exist multiple times within an EA or SCM system. Such data corrupts the entire system as there are many duplicate items that gives rise to 'Master Data Management' (MDM) problems.

Some of the existing solutions, take the relevant data out of enterprise application system like ERP system for repair and structuring before entering it back into the system. However, this approach is not useful and creates additional problems as the data gets dirty again within a few days.

Further, as the volume of data increases it becomes extremely difficult to identify the section of corrupt data and perform the repair and structuring on the entire data set time and again. In addition, the exercise is very expensive and time consuming. Since, enterprise application system like ERP is inherently a closed system, even addition of a solution on top of the existing ERP system, to resolve the problem for a short period of time is labor, time and money consuming. Further, such an approach creates problems in the long run as the volume of data keeps increasing and the complexity of the ERP system makes it impossible to repair the corrupt data which effects the entire process in ERP management system.

Also, every function in an ERP or SCM system requires specific process or rule to carry out the task. The type and characteristic of data utilized for carrying out these functions is different for different tasks. Due to inherent structural and architectural limitations, the existing systems are unable to pre-empt all issues arising out of an ERP or SCM system and devise a solution. Further, the current ERP and SCM systems are not equipped to handle dynamic changes in the data across different modules. Changes to the data is always in silos in the current system and for the change to take effect takes considerable amount of effort.

Accordingly, there is a need in the art for improved supply chain management (SCM) and ERP systems that self-evolve and self-drive the functions with real-time identification and resolution capabilities.

SUMMARY OF THE INVENTION

Accordingly, this disclosure provides a method for operating one or more applications. The method comprises receiving from distinct sources a plurality of data in a data lake, determine characteristic of at least one attribute of one or more of the plurality of received data wherein characteristic includes change in the at least one attribute or determination of the attribute as a new attribute, in response to change in the at least one attribute, identifying a plurality of data models to generate an impact data for predicting impact of the change on the one or more applications wherein the plurality of data models is auto-selected based on the change, and creating at least one script by a bot based on the plurality of data models, the change in the at least one attribute, the impact data and AI based processing logic for recommending an action/task wherein a plurality of functions of the one or more applications are re-calibrated automatically in real-time based on the recommended action/task.

In an embodiment, the present invention provides a self-driven system for operating one or more applications. The system includes a data lake configured to store a plurality of data from distinct sources in real-time, a control tower configured for controlling a plurality of functions associated with the one or more applications wherein the control tower determines characteristic of at least one attribute of one or more of the plurality of received data wherein characteristic includes change in the at least one attribute or determination of the attribute as a new attribute, a controller encoded with instructions enabling the controller to function as a bot to generate a plurality of data models created for performing the plurality of functions by utilizing a library of functions stored on a functional database of the data lake, and an AI based prediction and recommendation engine coupled to a processor configured for processing at least one prediction algorithm to generate at least one recommendation option in real time, wherein a bot creates at least one script based on the data models, the change in the at least one attribute, an impact data and AI based processing logic for recommending an action/task to automatically re-calibrate the plurality of functions of the one or more applications.

In another embodiment, the present invention provides a data lake for a self-driven system configured to operate one or more applications. The data lake includes a plurality of relational and non-relational databases configured for storing a plurality of structured or unstructured data received from distinct sources in real-time, at least one functional database storing a library of functions utilized for performing a plurality of functions of the one or more applications wherein a plurality of data models generated by a controller performs the functions in real-time, and a plurality of data models database configured for storing the plurality of data models, wherein the data lake is configured to store re-calibrated or re-modelled data models associated with the one or more applications wherein the data models are re-calibrated based on a predicted impact of a new attribute of the stored data on the one or more applications.

In yet another embodiment, the present invention provides a control tower for a self-driven system configured to operate one or more applications. The tower includes a tracking module configured to interact with a plurality of nodes associated with the one or more applications wherein the nodes are configured to interact with each other for performing a plurality of functions, sensing means for sensing characteristics of a data received at a data lake wherein a re-calibration of a plurality of data models is triggered based on the sensed characteristics of the received data only in case of enhanced performance by the models, and an analytics module configured to control an AI based prediction and recommendation engine wherein the engine is coupled to a processor configured for processing at least one prediction algorithm to generate at least one recommendation option in real time, wherein a bot creates at least one script based on the data models, the change in the at least one attribute, an impact data and AI based processing logic for recommending an action/task to automatically re-calibrate the plurality of functions of the one or more applications.

In an embodiment the present invention provides a self-driven system for operating on one or more applications. The system includes a query language (QL) tool configured for receiving, translating and extracting data related to a plurality of functions of the one or more applications. The tool includes an electronic user interface configured to receive a query data from the user, a translator/interpreter for translating the query data into characters using natural language processing (NLP) and generating a plurality of tokens, a code generator configured to receive the tokens from the translator/interpreter and generating a code using a data mapper and ingestion module for creating an AI based machine learning query, and at least one data model created based on at least one attribute of the query data and the tokens, wherein the machine learning query is processed to extract a recommendation based on to the query data received from the user, wherein a bot creates at least one script based on the data models, the machine learning query, the at least one attribute of the query data and AI based processing logic for recommending an action/task to automatically re-calibrate the plurality of functions of the one or more applications.

The present invention provides several advantages over the prior art. For example, in one advantageous aspect, the present invention provides a self-driven ERP or SCM system and a method for operating the same with faster processing times, reduced error and accurate data flow across the platform. The system utilizes sub network of devices and server for secured communication with reduced processing time due to automatic creation of scripts by a bot based on the data models, the change in the at least one attribute, the impact data and AI based processing logic for recommending an action/task to a user. The system includes re-calibration of a plurality of functions of the one or more applications in real-time based on the recommended action/task for accurate results. All of this results in a significant improvement in the overall functioning of an enterprise and supply chain computer system.

In an advantageous aspect, the system and method of the present invention optimizes resources by considering the customer demand and supply market conditions in real time. The system is driven by interconnected data across the entire supply chain.

In an advantageous aspect, the system of the present invention is not limited to a single set of rules, logic and workflow. The rules, logic, workflow change by industry, geography, commodity etc. to transform data models for achieving self-driven system capable of producing accurate, faster and efficient data results.

The invention provides a self-driven ERP system that is not dependent on single set of machine learning or AI algorithms or certain data sets. These algorithms or data sets change, evolve over time and the system is configured to use these algorithms and data sets and thus continue to improve its predictive capability.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
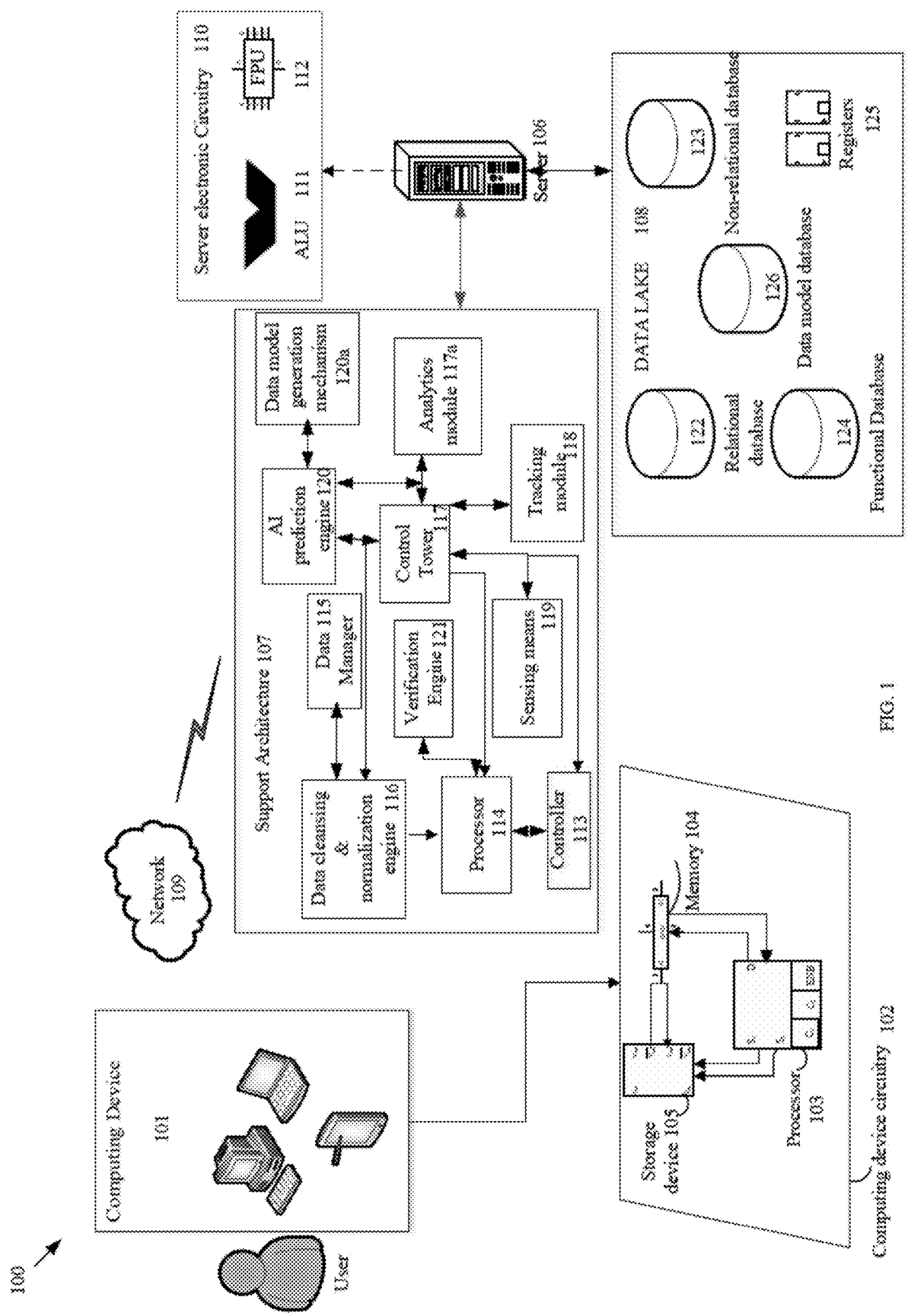
FIG. 1 is a view of AI based self-driven system for operation of one or more applications including EA and SCM in accordance with an embodiment of the invention.

Described herein are nonlimiting example embodiments of the present invention, which includes Artificial Intelligence, machine learning based self-evolving ERP systems and methods for operating the same.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "data," "characteristics," or "attributes," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to self-driven ERP system and methods of operating the same.

Referring to FIG. 1, a self-driven system 100 for operating one or more applications including supply chain management (SCM) and enterprise resource planning (ERP) applications is provided in accordance with an embodiment of the present invention. The system 100 includes at least one computing device/entity machine 101 for initiating at least one function to be performed on the one or more applications over a network. The system 100 further includes a server 106 configured to receive input from the entity machine 101. The system 100 includes a support architecture 107 for performing the functions on the one or more applications depending upon the type of input received at the server 106. The system 100 includes a data lake 108 for storing plurality of data from distinct sources, where the data includes, text data, voice data, image data, functional data, data models, scripts etc. to be processed based on Artificial intelligence and machine learning. The system 100 connecting various elements through a network 109. The network 109 enables formation of sub networks depending on the requirement of the function to be performed on the application.

In an exemplary embodiment, the self-driven system 100 of the present invention operates one or more applications that may include enterprise applications (EA) and/or supply chain management (SCM) applications.

In an embodiment, the enterprise applications include finance applications like automated billing applications and payment processing applications, Customer relationship management applications (CRM) and enterprise resource planning applications (ERP).

In an embodiment, the recommended task/action includes auto adjust data for the plurality of functions, risk mitigation, removing duplicate entry, or direct interaction with the plurality of nodes. Further, the duplicate entry can be of any data existing in the EA and SCM applications, including but not limited to supplier, invoice, contract etc.

In an embodiment, the entity machine 101 may communicate with the server 106 wirelessly through communication interface, which may include digital signal processing circuitry. Also, the entity machine 101 may be implemented in a number of different forms, for example, as a smartphone, computer, personal digital assistant, or other similar devices. The entity machine 101 includes internal circuitry 102 that may include processor 103, memory 104 and storage device 105.

In an embodiment the server 106 of the invention may include various sub-servers for communicating and processing data across the network. The sub-servers include, but are not limited to, content management server, application server, directory server, database server, mobile information server and real-time communication server.

In an example embodiment, the server 106 may include electronic circuitry 110 for enabling execution of various steps by a processor of the server 106. The electronic circuitry 110 has various elements including but not limited to a plurality of arithmetic logic units (ALU) 111 and floating-point Units (FPU) 112. The ALU 111 enables processing of binary integers to assist in formation of a tables/matrix of variables where a script created by data models is applied to data sets impacting multiple functions like demand planning, supply planning, forecasting, budgeting etc. in applications like ERP or supply chain management (SCM). In an example embodiment, the server electronic circuitry 110 as shown in FIG. 1, may additionally include other processors, memory, storage devices, high-speed interfaces connected through buses for connecting to memory and high-speed expansion ports, and a low speed interface connecting to low speed bus and storage device. Each of the components of the electronic circuitry 110 are interconnected using various busses and may be mounted on a common motherboard or in other manners as appropriate. The processor 114 can process instructions for execution within the server 106, including instructions stored in the elements of the data lake 108 like memory or on the storage devices to display graphical information for a GUI on an external input/output device, such as display coupled to a high-speed interface. In other implementations, multiple processors and/or multiple busses may be used, as appropriate, along with multiple memories and types of memory.

Also, multiple servers may be connected, with each server providing portions of the necessary operations (e.g., as a server bank, a group of blade servers, or a multi-processor system).

In an example embodiment, the support architecture 107 of the system 100 includes a controller 113 encoded with instructions enabling the controller 113 to function as a bot configured to generate plurality of data models for performing multiple functions. The controller 113 selects an Artificial Intelligence based dynamic processing logic using the bot to reduce the processing time for performing multiple functions of the ERP or SCM applications. The processing logic for each function of an application is different. The controller 113 is configured to determine and generate a processing logic for each function in real-time depending on the received data and processing cycle of that received data in the one or more application. For eg., the processing logic may include serial or parallel processing of certain functions depending on the impact on the one or more applications. The system also includes a processor 114 configured to process various functions based on the AI based processing of data sets and data models by the bot. The support architecture 107 includes a data manager 115 for managing data relating to any function of the Enterprise application EA or SCM application. In an example embodiment, the data may include supplier data with changed attributes like lead time during inventory or transportation function of a supply chain application. The support architecture 107 includes an AI engine 120 for determining relevant data models stored in a data model database 126 and created by a generation mechanism 120a for execution using the bot based on data sets received at the data lake 108. Further, the support architecture 107 includes a data cleansing and normalization engine 116 for receiving processed and cleansed data sets from the front-end server 106 to execute multiple functions of the one or more ERP and SCM application. The support architecture further includes a control tower 117 for controlling a plurality of functions associated with the one or more applications wherein the control tower determines characteristic of at least one attribute of one or more of the plurality of received data wherein characteristic includes change in the at least one attribute or determination of the attribute as a new attribute. The control tower 117 includes a tracking module 118 configured to interact with a plurality of nodes associated with the one or more applications where, the nodes are configured to interact with each other for performing a plurality of functions. The control tower 117 also includes a sensing means 119 for sensing characteristics of a data received at a data lake. The sensing means 119 of the support architecture 107 triggers a re-calibration of the plurality of data models based on the sensed characteristics of the received data only in case of enhanced performance by the models. The control tower includes an analytics module 117a configured to control the AI based prediction and recommendation engine 120.

In one embodiment, the support architecture 107 may include image processing unit, for processing an image data and converting it to a text data. Also, the sensing means 119 of the architecture 107 may include a voice to text convertor for enabling faster and accurate conversion of voice data to text data for execution of multiple functions. Further, the support architecture 107 includes a verification engine 121 for verifying the received data after matching with existing data in the data lake 108 to determine using control tower 117, the characteristic of the data including any change in attribute of the data or receipt of a new attribute data.

The processor 114 may be implemented as a chipset of chips that include separate and multiple analog and digital processors. The processor 114 may provide coordination of the other components, such as controlling user interfaces, applications run by devices, and wireless communication by devices.

The Processor 114 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor 114. In addition, an external interface may be provided in communication with processor 114, so as to enable near area communication of device with other devices. External interface may provide, for example, for wired communication in some implementations, or for wireless communication in other implementations, and multiple interfaces may also be used.

In an embodiment, the data cleansing and normalization engine 116 is configured to clean data received at the data lake in real time using natural language processing and machine learning algorithms for enhanced accuracy. Since, the data will be received from multiple disconnected sources, the engine 116 has an ability to remove duplicates, standardize and group the data. The cleansing engine is coupled to a data mapper and curator engine. The engine 116 detects and corrects Corrupt or duplicate or vague data. Further, the cleansed data is sent for approval through a routing mechanism post which they are stored in master data tables of the data lake. Also, an audit of the received data and cleansed data is stored in the data lake.

In an example embodiment, the data lake 108 includes plurality of databases as shown in FIG. 1. The data lake 108 includes a relational database 122a for storing related data sets received from distinct sources, a non-relational database 122b for storing non-related raw data sets, a functional database 124 for storing a library of functions enabling creation of a plurality of data models for execution of tasks in one or more applications including ERP and SCM, a plurality of registers 125 for temporarily storing data from various sources for determination of characteristic of the data like change in attribute of received data or receipt of a new attribute data itself. The received data may be image data, voice data or text data where the image and voice data can be converted to text data for analysis. The data lake 108 further includes a data model database 126 for storing plurality of data models, where the data models are re-calibrated based on a predicted impact of a new attribute data of the stored data on the one or more applications.

The data lake 108 may be supported by different memory like a volatile memory, a non-volatile memory or memory that may also be another form of computer-readable medium, such as a magnetic or optical disk. The memory may also include one or more storage devices capable of providing mass storage. In one implementation, at least one of the storage devices may be or contain a computer-readable medium, such as a floppy disk device, a hard disk device, an optical disk device, a tape device, a flash memory or other similar solid-state memory device, or an array of devices, including devices in a storage area network or other configurations.

Referring to FIG. 1, the various elements like the support architecture 107 and the memory data lake 108 are shown as external connections to the server 106 in accordance with an embodiment of the invention. However, it shall be apparent to a person skilled in the art that these elements may be part of an integrated server system. Also, some of the sub-elements of the support architecture 107 and the data lake 107 either alone or in various combinations may be part of a server system as other external connections.

In an embodiment the tracking module 118 of the system 100 is an IOT device or smart device configured to capture, store and transmit a data relevant to the one or more applications. The IOT device may be in secured communication with the at least one server 106 as part of the sub network.

In an example embodiment, the at least one IOT device may be a tracking device, an intelligent sensor, a smartphone, a voice controller, an image capturing device, a gesture controller, a smart watch or a combination thereof. The IOT device may include sensor processors with internal circuitry that may include processor, memory and storage device. The IOT device data includes sensor data on plant machinery, logistics carriers, security systems, warehouse cameras and sensors etc.

Figure 1A:
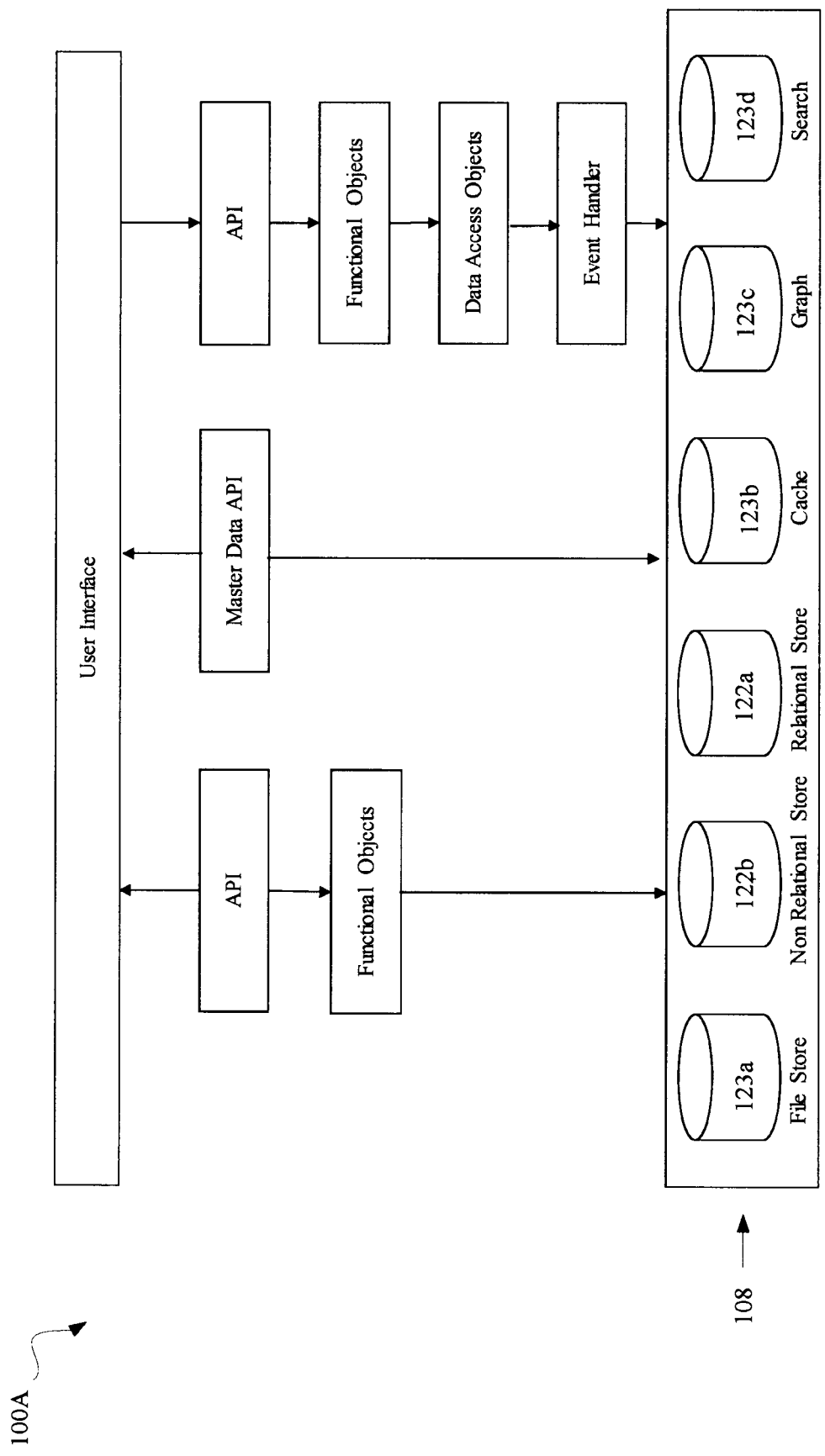
FIG. 1A is a perspective view of a high-level architecture of a self-driven system for one or more applications including EA and SCM in accordance with an embodiment of the invention.

Referring to FIG. 1A a perspective view of a high-level architecture (100A) of a self-driven system for one or more applications including EA and SCM is shown in accordance with an embodiment of the invention. The high-level system architecture includes a user interface (UI), an application programming interface (API), functional objects, data access objects, an event handler, and the data lake 108. The UI interacts with the data lake through a master data API. The data lake 108 includes a file store 123a, a cache 123b, a graph store 123c in addition to the relation database 122a and non-relational database 122b as shown in FIG. 1A.

Figure 1B:
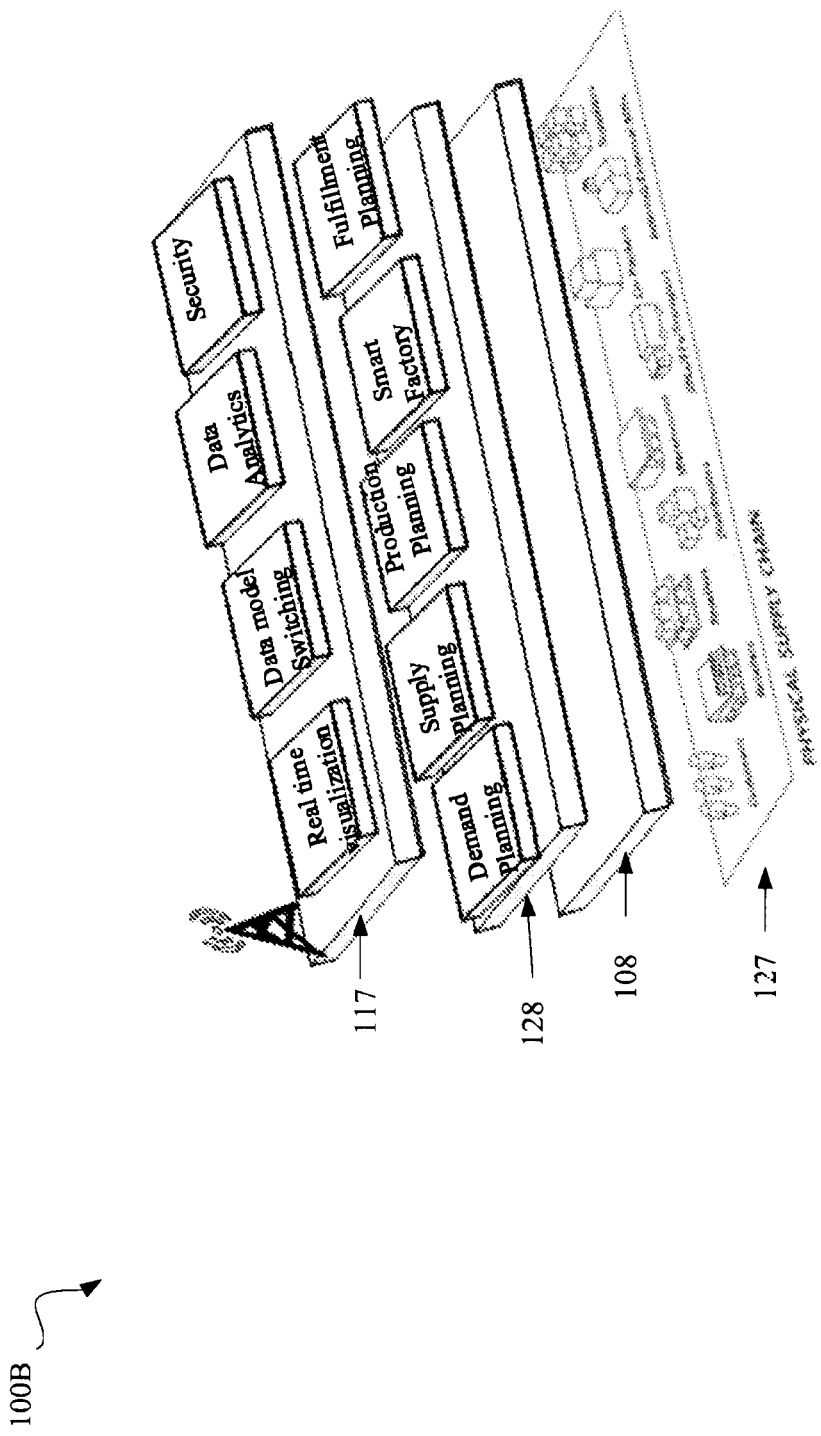
FIG. 1B is a perspective view of the system layers in accordance with an embodiment of the invention.
Figure 1C:
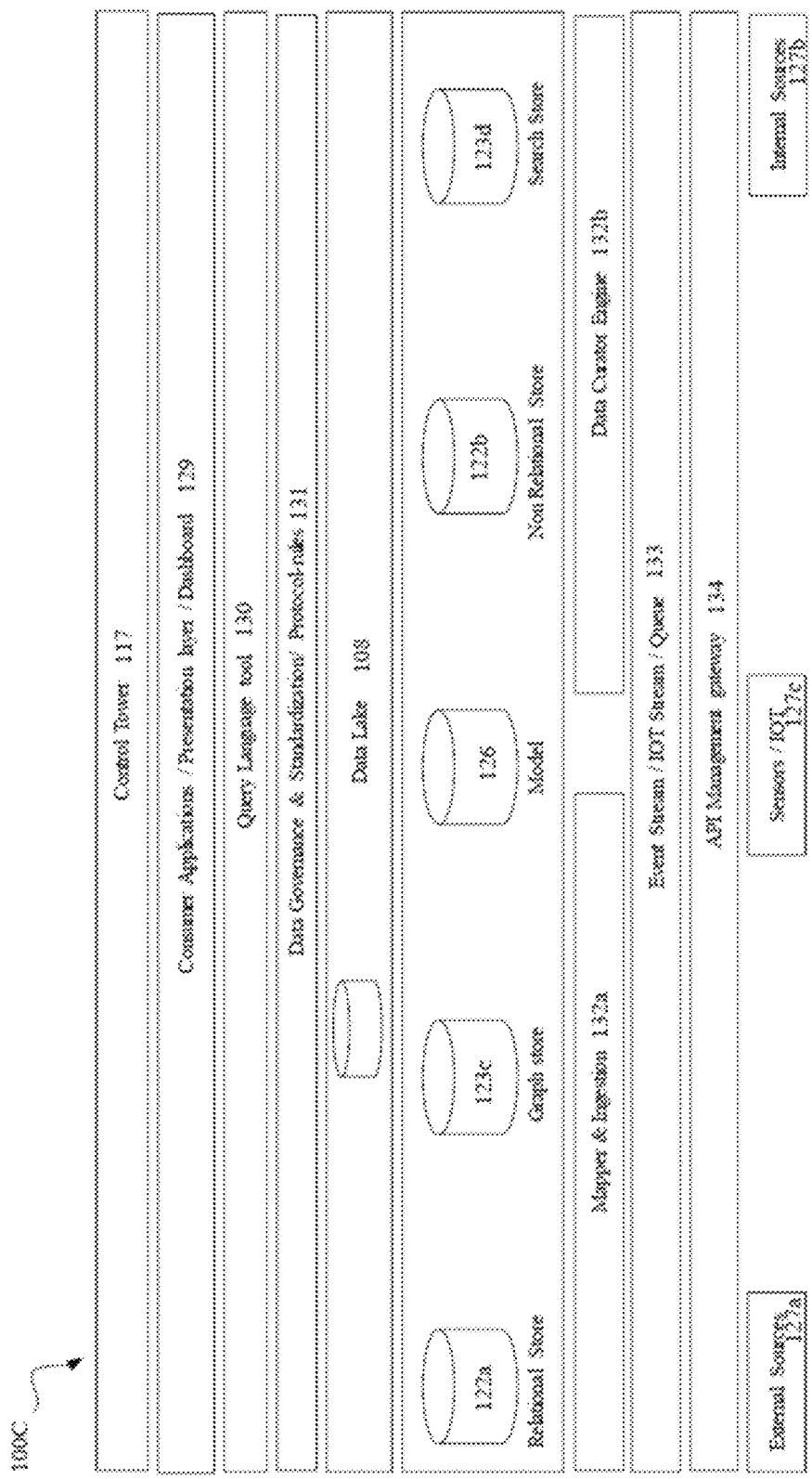
FIG. 1C is a data platform for the self-driven system in accordance with an embodiment of the invention.
Figure 1D:
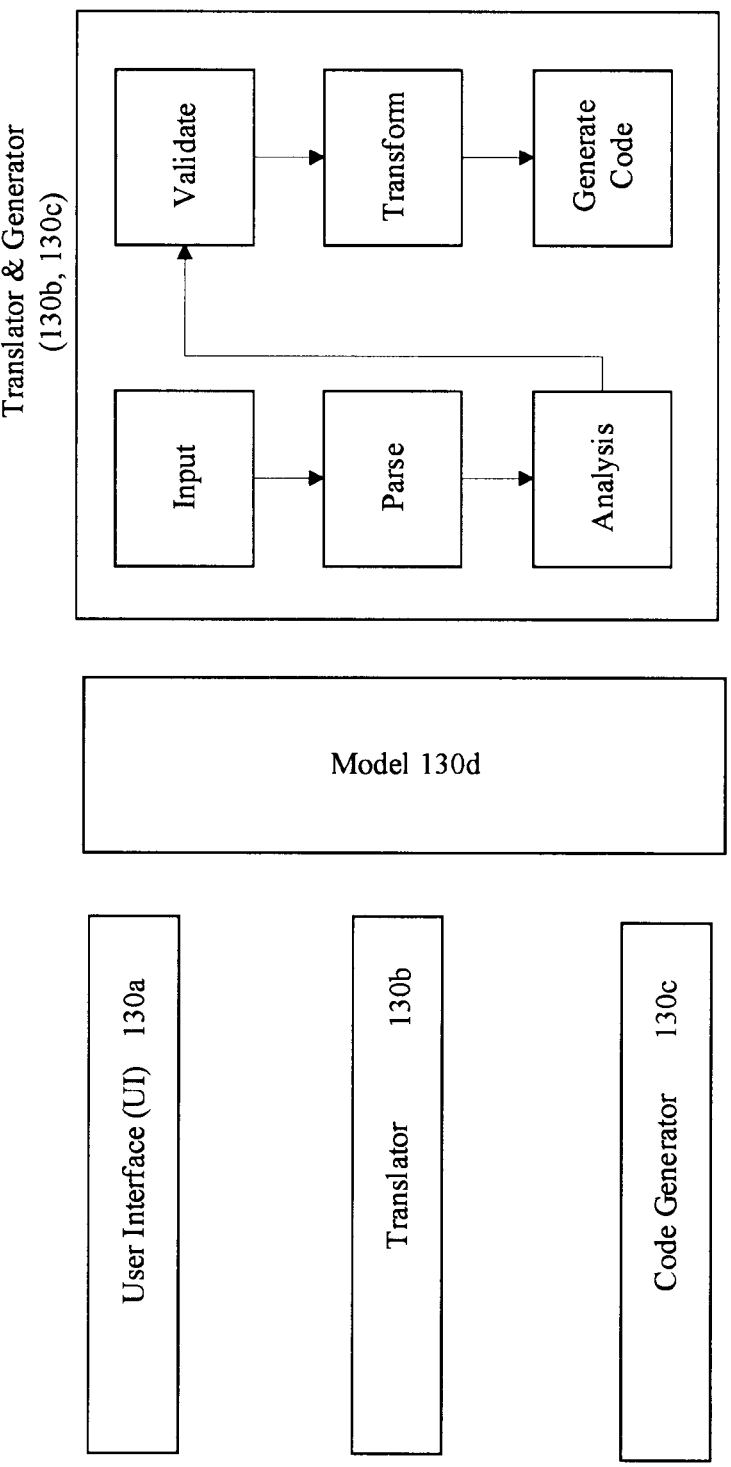
FIG. 1D is a block diagram of a query language tool for the self-driven system in accordance with an embodiment of the invention.

Referring to FIGS. 1B and 1C, system layer architecture diagrams with data lake/platform (100B, 100c) of AI based self-driven ERP and SCM system is shown in accordance with an embodiment of the present invention. The system 100a includes a plurality of distinct data source layer 127 to capture all customer, factory, supplier, machine and third-party sources of data (both structured and unstructured), the data lake layer 108 storing all data received from the distinct data source layer 127, an application function layer 128 configured to re-calibrate functions based on data models and scripts generated by a bot. The data models are auto-generated based on change in attribute of the received data to determine the impact of the change on the functions of the one or more applications. The system includes the control tower 117 configured to control the entire demand to supply application.

The system layer architecture includes an application/dashboard layer 129, a Query language tool (QL) 130, data governance & standardization/protocol layer 131, a mapper and ingestion module 132a, a data curator 132b, event stream/IOT stream/Queue 133, and an API management gateway 134. The distinct data source layer 127 includes external source 127a, internal source 127b and IOT source 127c.

In an exemplary embodiment, Query Language (QL) tool 130 provides a flexible and powerful way to get insights on transactional view across supply chain data model. The QL tool provides ability to apply desired machine learning algorithm on key attributes from the data platform. The recommendation is attached to desired workflow/UI element/rules/validations. Also, custom query is built to get access to operation store in real-time. The simplicity of QL tool allows non-technical stakeholders to drive optimal outcome of process by tweaking the operational parameters from control tower 117. The desired output is available in the form on simulation before it is applied to actual workflows.

In an embodiment, the query language tool (QL) 130 includes component structure 100c as shown in FIG. 1C. The structure is broken into 4 layers viz, simulator UI 130a, Translator 130b, Code Generator 130c and model 130d. The simulation UI 130a enables user to draft statements/query as per underlined model provided through intelligent sensing. The Translator 130 uses NLP and domain specific nomenclature repository, to tokenize query string received from user. Tokenizer takes a sequence of characters and output a sequence of tokens. It will analyze character by character, using multiple levels of lookahead in order to identity what token is currently being examine. The Code Generator 130c extracts Keywords and tokens that are used to generate underlying Machine Learning query and big data query. The Mapper is responsible to generate code and the model 130d utilized domain attributes, Synonyms and tokens.

In an embodiment, the tool includes an AI based prediction and recommendation engine coupled to a processor configured for processing at least one prediction algorithm to generate at least one recommendation option/task/action in real time.

In an embodiment, the tool is configured to attach the recommended task/action to a desired workflow or User interface element or set of rules or validations.

In an embodiment, the tool is configured to generate custom query for accessing data lake in real-time.

In an exemplary embodiment, the data lake 108 of the system is designed on "Data First strategy". Procurement and Supply Chain industry has been tackling capacity challenge, primarily due to digitalization and access to real-time time feed from manufacturing unit, logistic applications, including sensors and IOT. It is designed to handle wider variety of data from different source systems and starts with paradigm shift of just in time data warehouse with real-time integration and ML models. Platform will have capability to introduce new model on the enterprise data warehouse. Access to data quickly will help users in analysis. Users will have access to data from multiple sources in different formats.

Referring to FIGS. 1B & 1C, Data lake 108 also comprises of the graph store 123c which enables providing real-time recommendation based on historical data of demand and supply. It also provides ability for end users to track life cycle and relation of entities in the system. Data Relation analytics (using Graph store) will help users view relation-first perspective of their data which is not possible in classical data model. Information will feed into Analytics and Dashboard 129, with a view getting mode insights. Graph algorithms library will also provide the ability to detect hard-to-find or complex patterns and structures in supply chain data model. The graph store creates a hierarchical tree of relations based on user actions. Further it enables QL tool to search results efficiently.

In another exemplary embodiment, the data Curator engine 132b is one of the key subscribers to application events. Curator engine 132b subscribes to all incoming messages from service provider including external sources 127a, internal sources 127b and sensors/IOT devices 127c. It collects data from diverse sources, acts a gateway and identifies data attributes to be extracted from application event. The curator engine 132b with the help of mapper and ingestion module 132a stores the received data in multiple type stores viz, the search store for advance search, graph for data and relations, flat structure for logs purpose etc. The Curation including selection and organization of data takes place through capturing metadata and lineage and making it available in a data catalog.

The data flows in the data lake in real-time processing through event stream layer. Domain Model exposed through the query language (QL) tool 130 enables user to self-serve their data and analytical requirements. Models developed by users are utilized to improve the insights for future purpose.

In an embodiment, the system architecture and applications are designed on API first strategy. All producers and consumers of the data in the system expose data using restful services (API). Central API gateway 134 ensures high reliability and fault tolerance. In case calling application is not reachable, it includes inbuilt retry policies to manage connectivity failures. Further, it provides additional layer of security.

In an exemplary embodiment, the system data platform enables event stream/IOT stream layer 133. The applications in supply chain emits application events based on automated workflow or user-based actions. The data received from various sources including sensors and IOT devices are routed through event handler/integrator. The integrator component is responsible to establish connect with event store and push message. Message router consumes message from store and republishes it to subscribers as per routing rules and message type. The subscriber will complete the desired functional workflow. The strategy assists in removal of peer connection for scaling the applications. Layer is responsible to provide real time feed to the data lake, which in turn will trigger model and classification engine.

In an embodiment the data Mapper layer and ingestion module 132a is responsible to transform data received from disconnected source systems. Ingestion pipeline and sophisticated AI based Data Mapper pushes data in large repository.

In an exemplary embodiment the control tower 117 is configured for real time visualization of flows in the one or more applications, switching between data models, setting up alert-notifications, data analytics, ensuring security of the data. wherein the tower enables easy communication between the nodes as well as allows having visibility and manages the plurality of functions across the one or more applications.

In an embodiment, the received data includes attributes of different types including alphabets, numbers, images, wherein the tower 117 is configured for controlling application of multiple data models on the received data including switching between data models in real-time.

In an example embodiment, the Data Lake 108 includes data received from nodes or sources such as customers or retailers, distributors, factories, productions, suppliers etc. It also includes data from outside sources such as financial markets, weather, social media, geo-economics etc. On this Data Lake the executional platform is built that includes functions or products such as planning, Production, Procurement, Suppliers etc. This enables the system to build a real time machine learning or AI based recommendations that guide the user to conduct his or her work on daily basis with more accurate data, with higher confidence and from a system that is easier to use and intelligent.

In an embodiment, the plurality of distinct data sources includes internet of things (IOT), demand from various sources at different levels like retailers, distribution channels, POS systems, customer feedback, supplier collaboration platform, invoices, purchase orders (PO), finance modules, inventory management module, contracts and RFx module, supplier module, item master, bill of materials, vendor master, warehouse management module, logistics management module, social media, weather, real time commodity and stock market prices, geo-political news etc. It shall be apparent to a person skilled in the art that the data source may include other source within the scope of the present invention.

In an embodiment, the system of the present invention includes means to add incremental data sources as the system evolves.

In an example embodiment, the EA and SCM applications include a plurality of nodes at the data source layer 127 like inventory, logistics, warehouse, procurement, customers, supplier, retailers, distributors, resellers, co-packers and transportation wherein the nodes interact with each other to structure the plurality of functions associated with the applications. It shall be apparent to a person skilled in the art that the nodes may include other nodes within the scope of the present invention.

In an embodiment, the plurality of functions of the application function layer may include demand planning, supply planning, production planning, forecasting, smart factory and fulfillment planning among others. It shall be apparent to a person skilled in the art that the EA and SCM applications may include other functions within the scope of the present invention.

In an exemplary embodiment, the system of the present invention includes interconnected data across the plurality of functions connecting demand with supply by combining customer and supplier data in real time and thereby structuring a collaborative platform for multiple entities like supplier, customer, factories and warehouses. Since data related to each function is stored and managed through a common data lake, the data is interconnected across functions through the common platform. Demand and supply is connected through the collaborative platform as the impact of change in data is assessed for individual functions using analysis of the same received data on the common platform. Also, the relation and utilization of all data sets across functions and applications is assessed to connect demand and supply.

In an embodiment, the collaborative platform is configured to maximize profits and margins as an accurate demand and commodity prices data is available in real-time for improved decision making based on the recommended tasks.

In an embodiment, the impact data is determined by the data models for predicting impact of the change on the one or more applications wherein the data models are auto-selected based on the change. Consider, transportation in SCM, if a supplier address is changed in the received data, then it would impact multiple applications and functions. For eg., the lead time would change based on distance of the supplier from the delivery point, the pricing of the service would change which in turn would impact functions like PO etc. This change in data or attribute of the received data would impact multiple functions across one or more applications at a different scale. The impact data determined by the data models provides a common reference for assessing the impact of the change thereby enabling the bot to structure the multiple functions in reduced time frame for faster processing.

In an embodiment, the system is provided in a cloud or cloud-based computing environment.

In an embodiment the system 100 includes a test module configured to test the plurality of data models and apply the tested data models to the one or more applications in real time. The testing is done via simulation on the control tower. Further, real time data is fed into the data model and results are compared in real time to determine accuracy and efficiency of the data models. The system 100 is configured for switching data models for different applications based on the functions and efficiency of the tested data models for those functions. The switching happens in real time and is an extremely complex process carried out using AI based analysis of performance of the data models, the received data, and the functions related to different applications of ERP and SCM system.

In an example embodiment of the invention, the self-driven ERP and SCM system 100 provides a sub network including the at least one server 106 in communication with a plurality of distinct data sources including TOT devices (examples of tracking module 118) like image capturing device, smartphone and sensor. Further, the sub network includes communication between various network components like sub-servers, TOT devices associated with multiple ERP and SCM applications, for executing identified functions. The sub network enables interlinking of change in data to different functions for performing an integrated operation and simultaneously also enables performance of identified single function by utilizing essential steps from the other network components of the sub-network.

In an embodiment the ERP and SCM applications include supplier management operations, procurement operations, inventory management operations, account payable operations etc. An example of the present invention organizes the supply chain between manufacturers and service providers. In an example of the present invention, the SCM operations include elements that enable management of end-to-end supply chain information such as demand planning, order fulfillment, scheduling, inventory, etc.

In an example embodiment of the present invention, SCM with multiple manufacturers and service providers, some of the advantages of the present system include the fact that economies of scale are enabled, procurement and inventory are rationalized, distribution and logistics facilities are rationalized, and the development of an industry-wide standard is facilitated.

In an embodiment, the demand and supply of manufacturer offerings are planned utilizing the sub network in operation and orders for the manufacturer offerings are also managed utilizing the sub network with server and IOT devices in communication with each other for data capturing and exchange. The sub network is also utilized to manage sub network assets including providing maintenance and service for the sub network assets utilizing the sub network.

In one of the advantageous aspects of the present invention, the self-driven system for ERP and SCM applications provides revenue enhancement, cost reduction and capital reduction by efficient utilization of resources with reduced timelines due to real-time remodeling or recalibration of data models/machine learning models impacting multiple functions across ERP and SCM.

In a related aspect, the revenue enhancement includes faster site integration time, enhanced network performance, rapid integration of acquisition and faster order to cash. The cost reduction includes duplication reduction, rationalization of distribution facility, rationalization of procurement operations, simplified processes and rationalization of transportation. The capital reduction includes reduced inventories due to faster processing times of SCM operations, and appropriate utilization of manufacturing capacity.

In an embodiment, the inventory management function of the SCM application at a warehousing includes scanning of a set of received goods by a tracking module/IOT device 118 and transmitting the specific warehousing data of the scanned goods to the at least one server for storing in the data lake. Any change in the data is analyzed and reflected across functions using data models and scripts.

In example embodiments, the bot is a software bot or a combination of a software and hardware bot. In an embodiment, the software bot is a computer program enabling a processor to perform remodeling or recalibration of functions by utilizing AI.

In another embodiment, the bot as a combination of hardware and software, where the hardware includes memory, processor, controller and other associated chipsets especially dedicated to perform recalibration of data models to carry out functions for ERP and SCM applications.

In an embodiment, the at least one server includes a front end web server communicatively coupled to at least one SQL server wherein the front end web server is configured for reprocessing the functions of the one or more applications based on the plurality of data models and script by receiving the recalibrated function processed by the SQL server and applying the AI based dynamic processing logic to the data models and functions using the bot. The AI based processing logic includes a sequential, a parallel or a switching-based processing logic or a combination thereof.

In an embodiment, the system 100 includes an execution engine for receiving changed data and generating impact data processed from the front-end web server for determining impact of change on plurality of functions of the one or more applications to predict and recommend a task/action to the user for enabling the user to initiate the action through the electronic user interface.

Figure 1E:
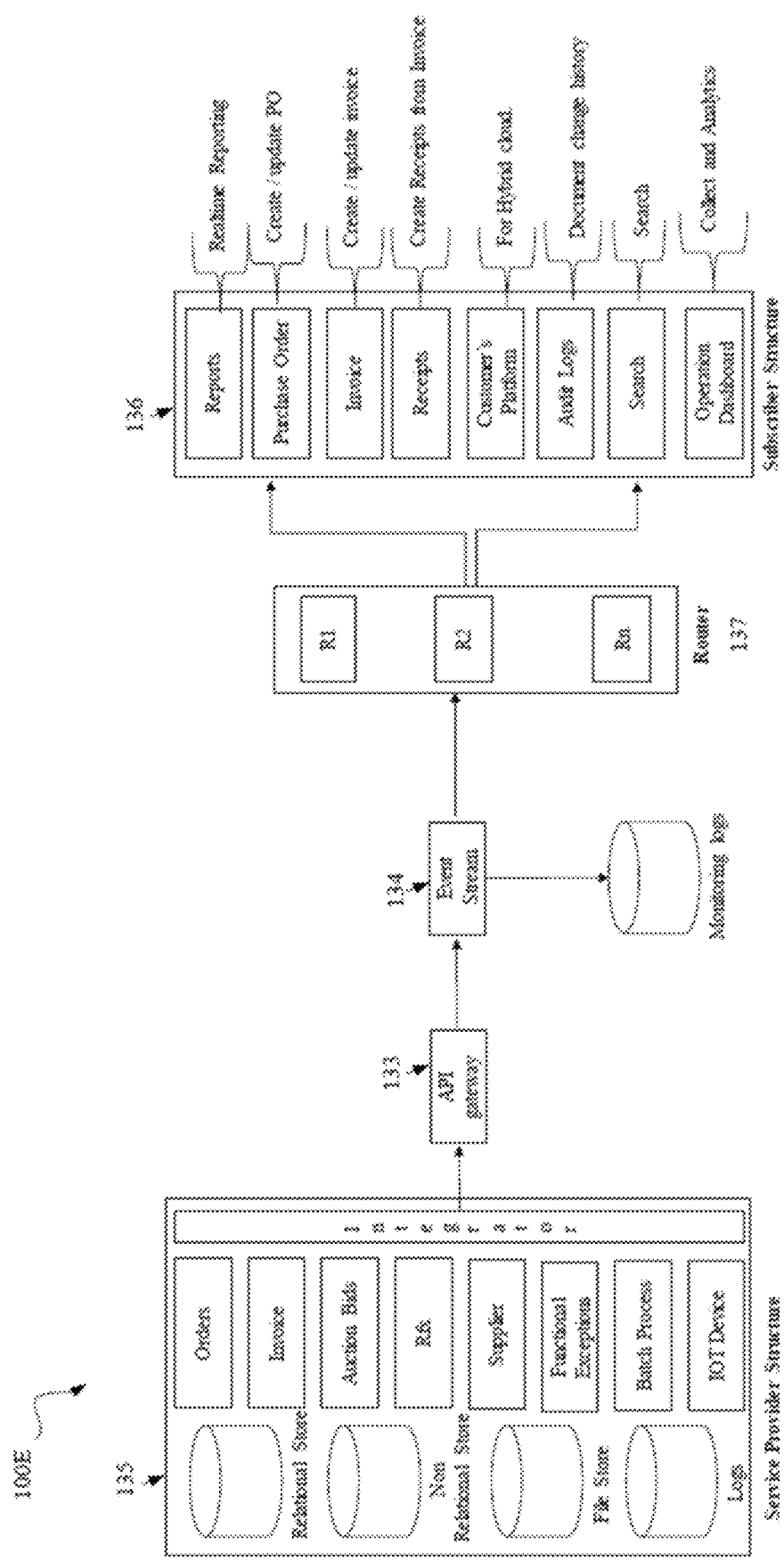
FIG. 1E is a block diagram for an event flow in the self-driven system in accordance with an embodiment of the invention.

Referring to FIG. 1E a block diagram 100E of the self-driven system with service provider structure 135 and subscriber structure 136 is shown in accordance with an embodiment of the invention. The interaction and data exchange between the service provide and subscriber is through the API gateway 133, event management block 134 and routers 137.

Figure 1F:
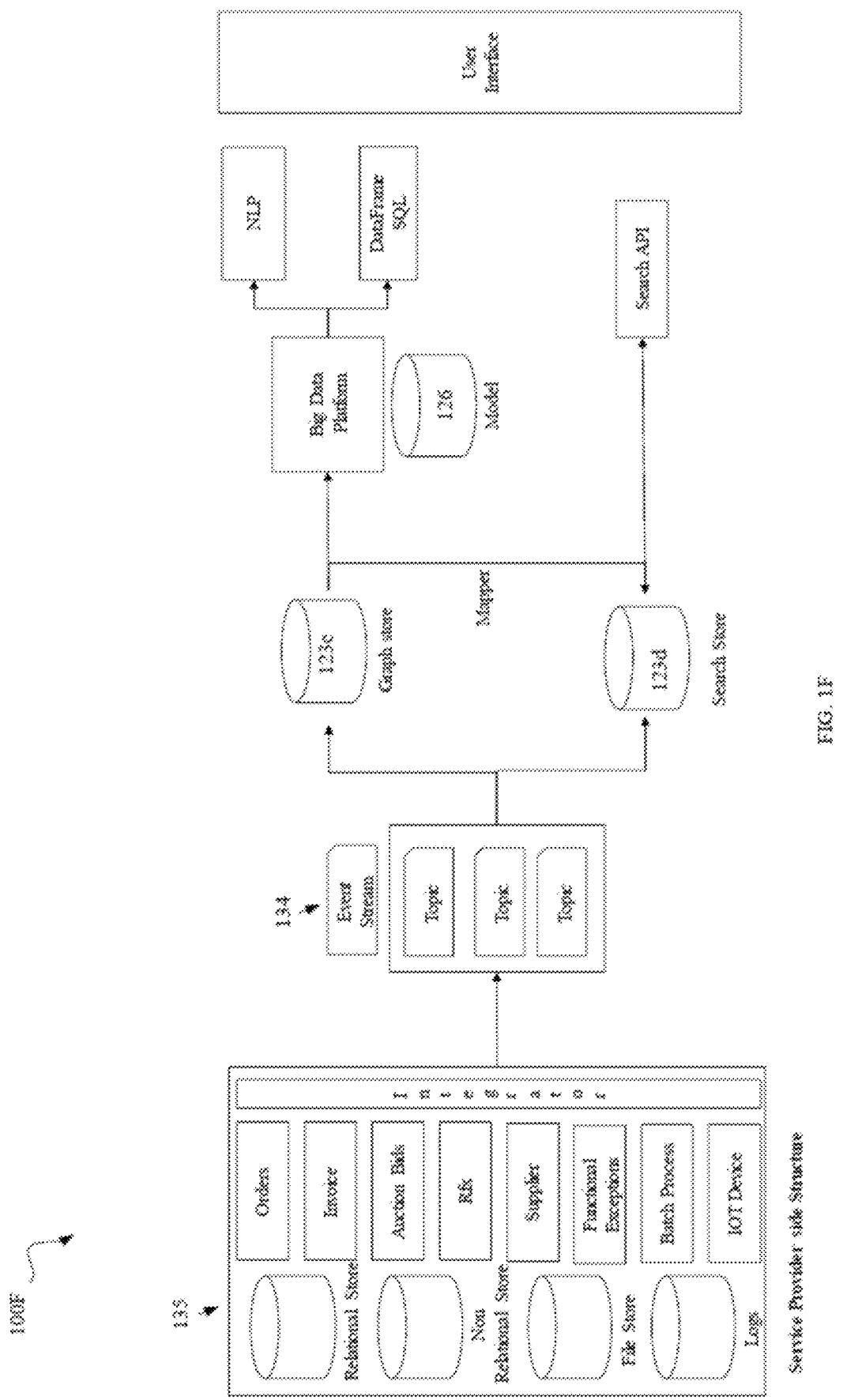
FIG. 1F is a block diagram of a recommendation platform generating recommendation of a task/action to a user of the self-driven system in accordance with an embodiment of the invention.

Referring to FIG. 1F is a block diagram 100F of a recommendation platform generating recommendation of a task/action to a user of the self-driven system is shown in accordance with an embodiment of the invention. The service provider structure 135 interacts through event stream 134 with data lake having graph store 123*c* and search store 123*d*. The data extracted from the data lake after NLP of the received data and using data frame SQL is provided to the subscriber through the user interface.

Figure 2:
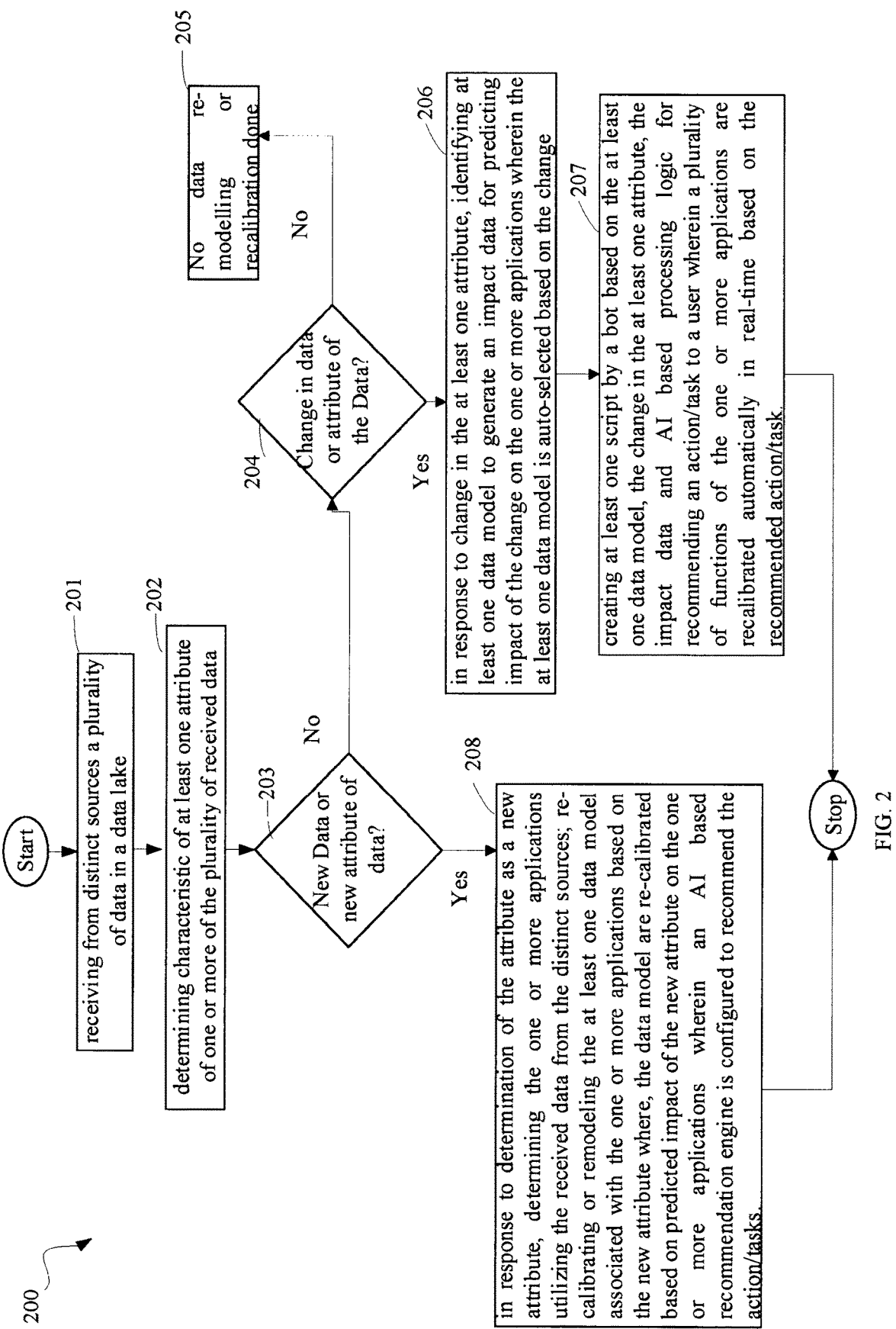
FIG. 2 is a flowchart depicting a AI based method for operating one or more application in accordance with an embodiment of the invention.

Referring to FIG. 2 a flowchart 200 depicting a method for operating one or more applications including ERP and SCM applications is shown. The method comprises the steps of S201 receiving from distinct sources a plurality of data in a data lake. In S202 determine characteristic of at least one attribute of one or more of the plurality of received data. In S203 checking if received data is new data or data with new attribute. If No, then in S204 checking if there is change in received data or attribute of received data. If No, then in S205, no data remodeling or recalibration required. If there is change in data or attribute of received data, then in S206 in response to change in the at least one attribute and/or change in the data, generating by data models an impact data for predicting impact of the change on the one or more applications wherein the data models are auto-selected based on the change. In S207 creating at least one script by a bot based on the data models, the change in the at least one attribute, the impact data and AI based processing logic for recommending an action/task wherein a plurality of functions of the one or more applications are re-calibrated automatically in real-time based on the recommended action/task. In S203 if it is determined that that received data is a new data or data with new attribute then in S208 in response to determination of the attribute as a new attribute, determining the one or more applications utilizing the received data from the distinct sources; re-calibrating or remodeling the data models associated with the one or more applications based on the new attribute wherein the data models are re-calibrated based on predicted impact of the new attribute on the one or more applications wherein an AI based recommendation engine is configured to recommend the action/tasks.

In one example embodiment as depicted from the flowchart 300, in S301 a supplier data is received at the data lake and the impact of the data for carrying out a method of operating on one or more applications. In S302, determining characteristic of at least one attribute of the supplier data amongst (Vendor name, firmographic attributes such as City, address, operating countries, number of employees, financials, products or services offered etc) or other attributes of the supplier such as average lead time for delivery etc, from the received supplier data. This data may change in any of the modules/functions of the one or more applications. Since, it extremely difficult to track this change in any other module of the application, it leads to delayed actions. The self-driven system and method of operating on ERP and SCM application of the present invention enables, reflection of any change in any of these attributes across other modules/functions. Further, the change is also considered in the ML (machine learning) models driving specific actions in real-time. In case the supplier is a critical supplier who supplies specific materials critical to the manufacturing line operations, any change would be very critical. If the system senses that the deliveries of this supplier have been consistently delayed over the last 3-4 cycles and these changes are used by the data models or machine learning algorithms to determine the new lead time for the specific products, then this insight is extremely valuable to the organization in many ways to take action or perform tasks based on recommendation. In such a scenario, the action includes initiating a call/meeting with supplier to understand delays, take immediate corrective actions to mitigate the risks, adjust the process with refreshed lead times or adjust inventory with new forecasts. The method steps for operating on the one or more applications include S303, checking if new attributes are introduced to data lake, if yes then in S304 Cleansing/transformation of new attributes (remove outliers, normalization, impute missing, dimensionality reduction etc). In S305, a correlation between new attributes and existing model predictor attributes is checked. In S306, highly correlated variables are removed. The correlation between attributes/variables are measured by techniques including but not limited to correlation co-efficient, variable inflation factor (VIF) etc. In S307, retraining each model with existing and new attributes. In S308, checking if metrics are provided, if no then in S309, existing model is retained else, if yes then in S310, new model is deployed via docket imager. In S303 if new attributes are not received then checking if there is any drastic change in value of attribute of the received data in S311. The change is a preset threshold change in the value or percentage of change as set by the user. If there is drastic change then, in S312 alternate model is deployed. If no drastic change then, in S313 checking in real-time if alternate models in library/data model database are performing better. If Yes then, alternate model is deployed, else if no, then in S314 data model with new attributes with larger data variance is retrained. In S315, results with different datasets are tested and validated. In S316, retrained model is deployed. When the data is received at the data lake, at least one data model is identified from the data model database for generating impact data. Also, simultaneously the performance of the identified data model is determined before applying to the received data based on historical records of the data model. In S311*a*, checking if there is drastic reduction in model performance (less than threshold). If no, then S312*a* nothing is done, else in S313*a* checking if alternate models in the library/data model database are performing better. If yes, then in S314*a* new model is deployed else, in S315*a* model with more attributes, better sampling techniques is retrained. In S316*a*, alternate model is deployed.

In exemplary embodiment, each of the plurality of machine learning (ML) models are built on real time data across all data points in the supply chain data lake, with multiple predictor attribute. This leads to models with higher degree of accuracy and confidence.

Figure 3:
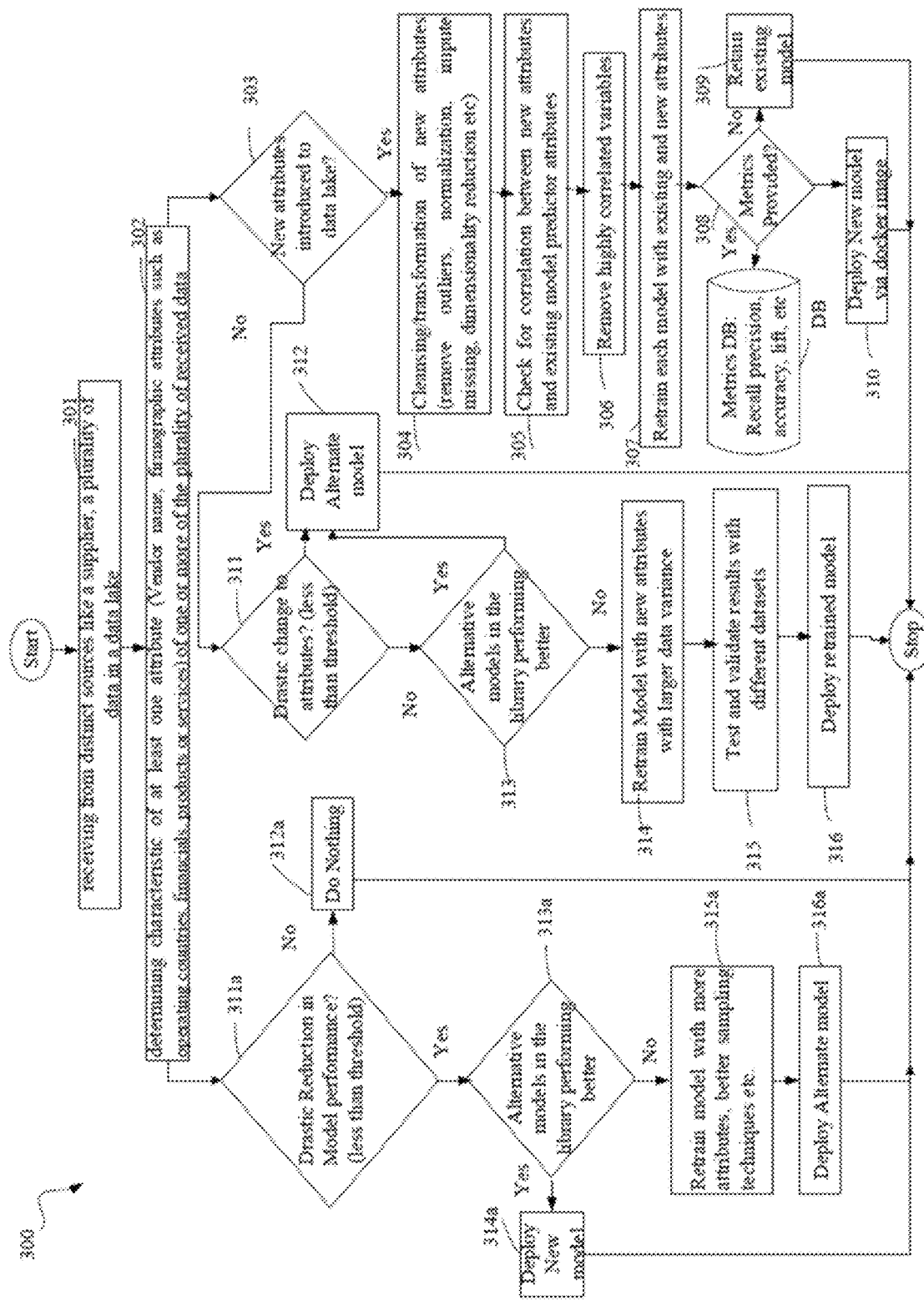
FIG. 3 is a flowchart depicting an example embodiment with supplier data and AI based remodeling and re-calibration of data models and function of one or more application including EA and SCM in accordance with an embodiment of the invention.
Figure 3A:
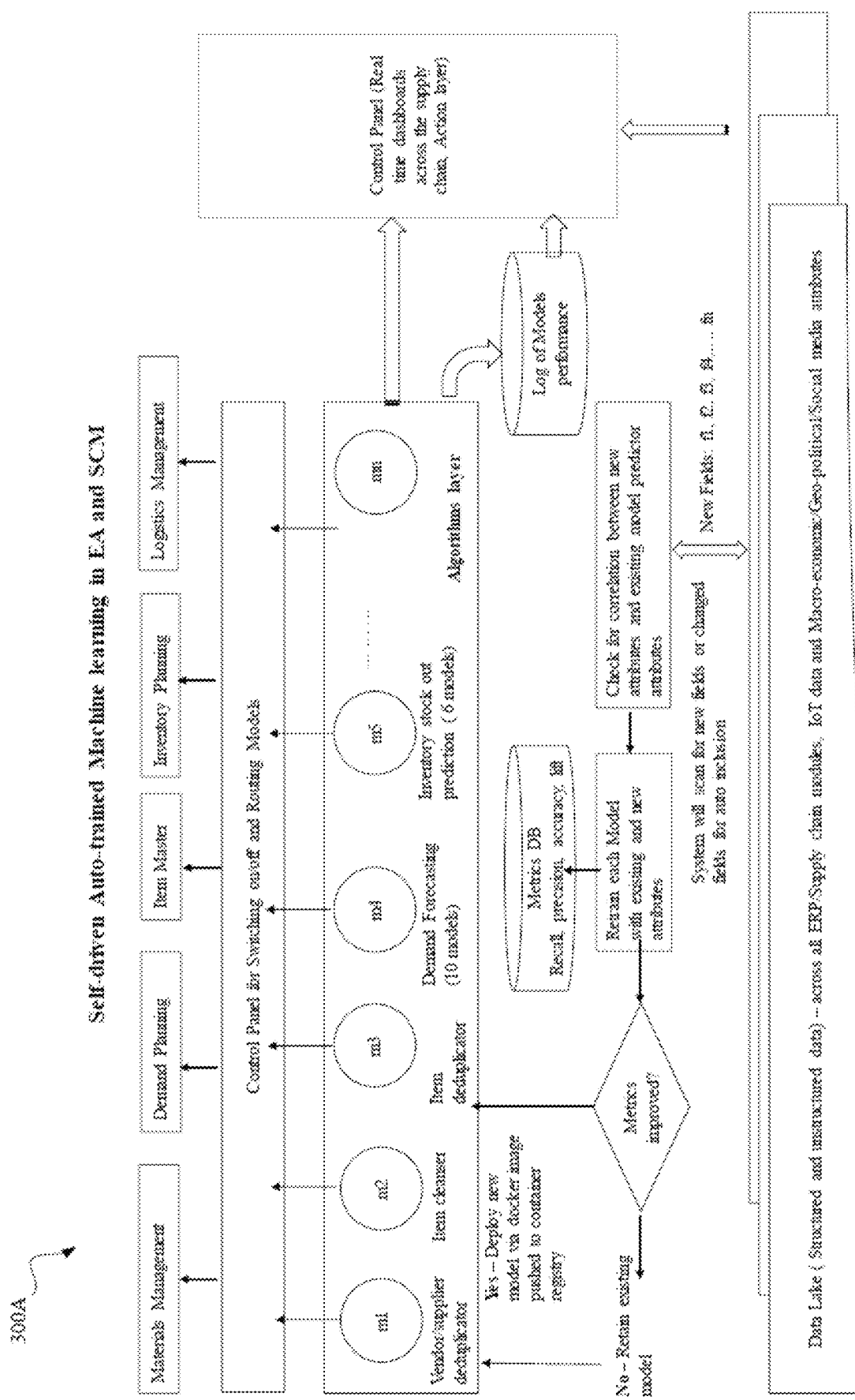
FIG. 3A is a view of a flow diagram depicting a self-driven auto trained machine learning in EA and SCM applications in accordance with an embodiment of the invention

In another embodiment, any changes in the data in any of modules of the ERP system is sensed by the control tower and the real time dashboards and an auto-refresh/Auto-training of the ML models is triggered as depicted in flow diagram 300A of FIG. 3A. In an exemplary aspect, the process is set such that the new model will be evaluated with the current model and will replace the current model only if it outperforms the current model.

In yet another embodiment, if there are any new data fields from new sources of data being added to the data lake, auto-ML will be triggered to conduct the entire process of exploratory data analysis, model building and deployment.

In an exemplary embodiment, the system and method of the present invention provides multiple ML models (different techniques) for the same use case scenario. At any point in time, there's one model that is operational or deployed for a given use case scenario, but the other models are constantly being refreshed and monitored for better metrics of performance. The models can be switched through the control Panel manually or automatically. This overcomes the issues related to the concept drift or the decreased performance of ML models over a period.

In an embodiment, the system includes pro-active detection algorithms for any record/transactions (items/Suppliers/PO/Invoices etc) being entered by a user (supplier/Customer/Employee etc) at the user interface. These will ensure that the Master tables are clean, accurate, complete and non-fraudulent/non-duplicate at any point in time and the data flowing through every single module or pipeline is clean and accurate. The master tables are stored in relational database 122*a*.

In an exemplary embodiment, the data models such as item master cleanser and vendor master cleansing algorithms run at the backend at frequent intervals when it gets triggered with ingestion of new items. If the items are duplicates with a very high degree of confidence, the system is sent for approval to the approver immediately. This ensures a high throughput of the platform maintaining a high level of hygiene and cleanliness. All this is achieved automatically using the bots, data models and scripts.

In an embodiment of the present invention, any ERP or SCM operation requires a finite amount of processing time on a computer processor. Further, the accuracy of results or any process depends on how faster data cleansing is carried out in any application. The present invention restrains the process of remodeling or re-calibration of data models for carrying out multiple functions of one or more applications, where the data model and scripts created by the bot and AI enable real time remodeling and re-calibration by selecting the fastest processing route for determining changes in data received at the data lake, while simultaneously satisfying the needs of obtaining accurate results, data elements are organized/processed depending on the demands of the computing resources, which allow more functions of the one or more applications to be processed with same resources (e.g., disk space, processor speed, memory, etc.). For Eg., a data received with change in supplier lead time would impact inventory, warehousing, transportation functions. The real time remodeling of data models to incorporate impact of the change across multiple functions and applications is carried out using the same resource (data lake, control tower, processor, controller). Thus, the net result of the claimed invention provides improved processing and functioning of self-driven ERP and supply chain systems. The logical processes involved with the self-driven ERP and SCM system define the improvement.

Figure 4:
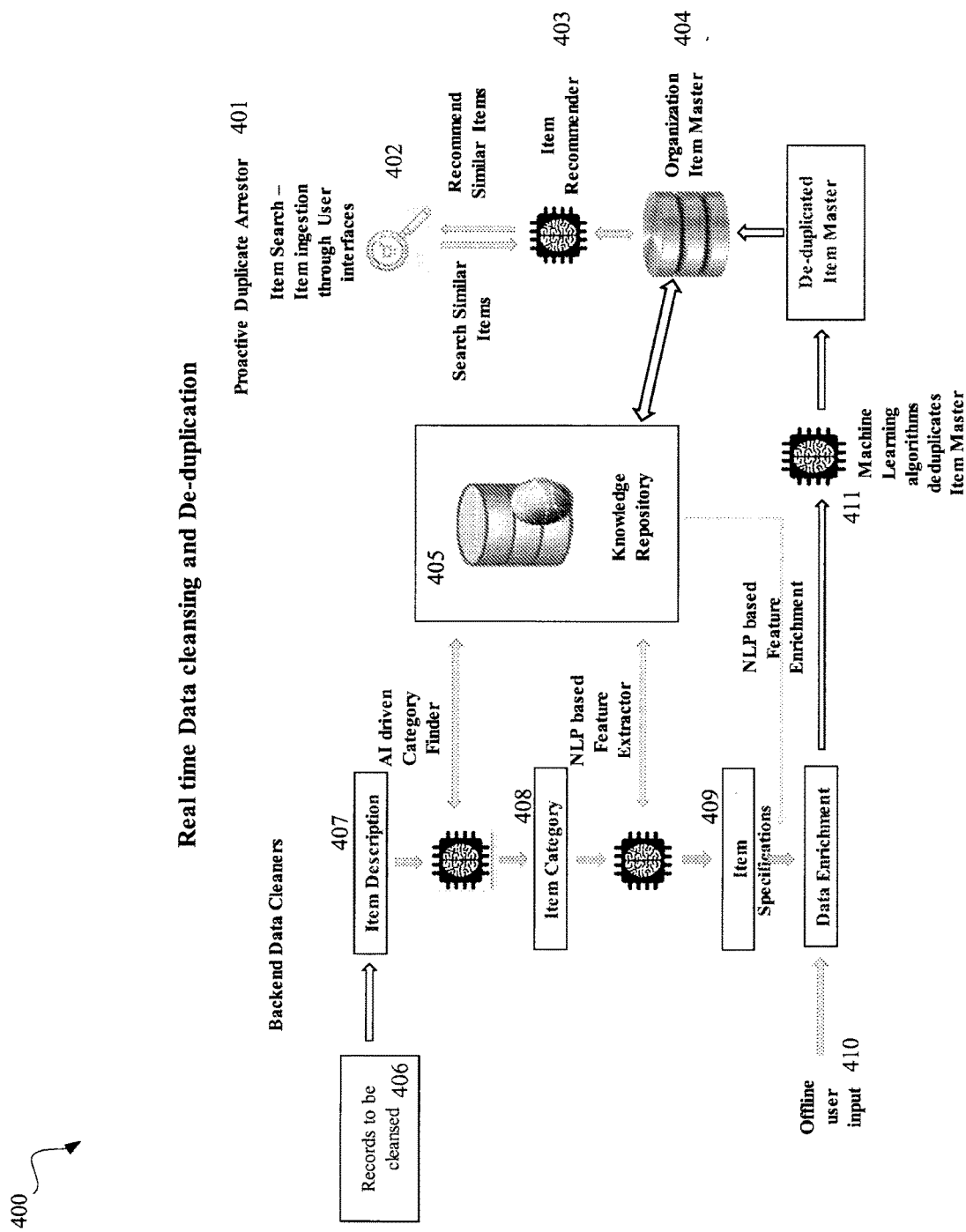
FIG. 4 is view of a flow diagram depicting as an example a real-time data cleansing and de-duplication in EA and SCM applications for item data in accordance with an embodiment of the invention

Referring to FIG. 4, a flow diagram 400 depicting a data cleaning and de-duplication process for an item data in the one or more applications is shown in accordance with an example embodiment of the present invention. The self-driven system and method of the present invention includes proactive duplicate arrestor 401 configured for real time search 402 capabilities initiated by a user through a user interface. The system recommends similar items based on feedback from item recommender 403, which in turn processes the search through an item master 404. The item master 404 is connected to the knowledge repository 405 interacting with various master databases including data model databases. The system deploys backend data cleaners configured for identifying and cleansing duplicate item records 406 based on item description 407, item category 408, item specification 409. The system also includes AI driven category finder, NLP based feature extractor and NLP based feature enrichment for data received from a user 410 offline. The NLP based feature enrichment of data enables implementation of machine learning algorithm/data models 411 for de duplicating item master database.

Various computing devices referred to as IOT devices the entity machines, server, processor etc. of the present invention are intended to represent various forms of digital computers, such as laptops, desktops, workstations, personal digital assistants, and other appropriate computers. Computing devices of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an exemplary embodiment the present invention includes an intelligence platform for supporting the various functions carried out by AI based self-driven systems. The platform collects data from different sources such as customer data, supplier onboarding data, data from social media into a data repository and enables more accurate forecasting, budgeting, Commodity management including pricing, variance, supplier Risk and performance management and other benefits. More particularly, the intelligence platform enables the prediction algorithm to identify and recommend action/tasks to a user.

Figure 5:
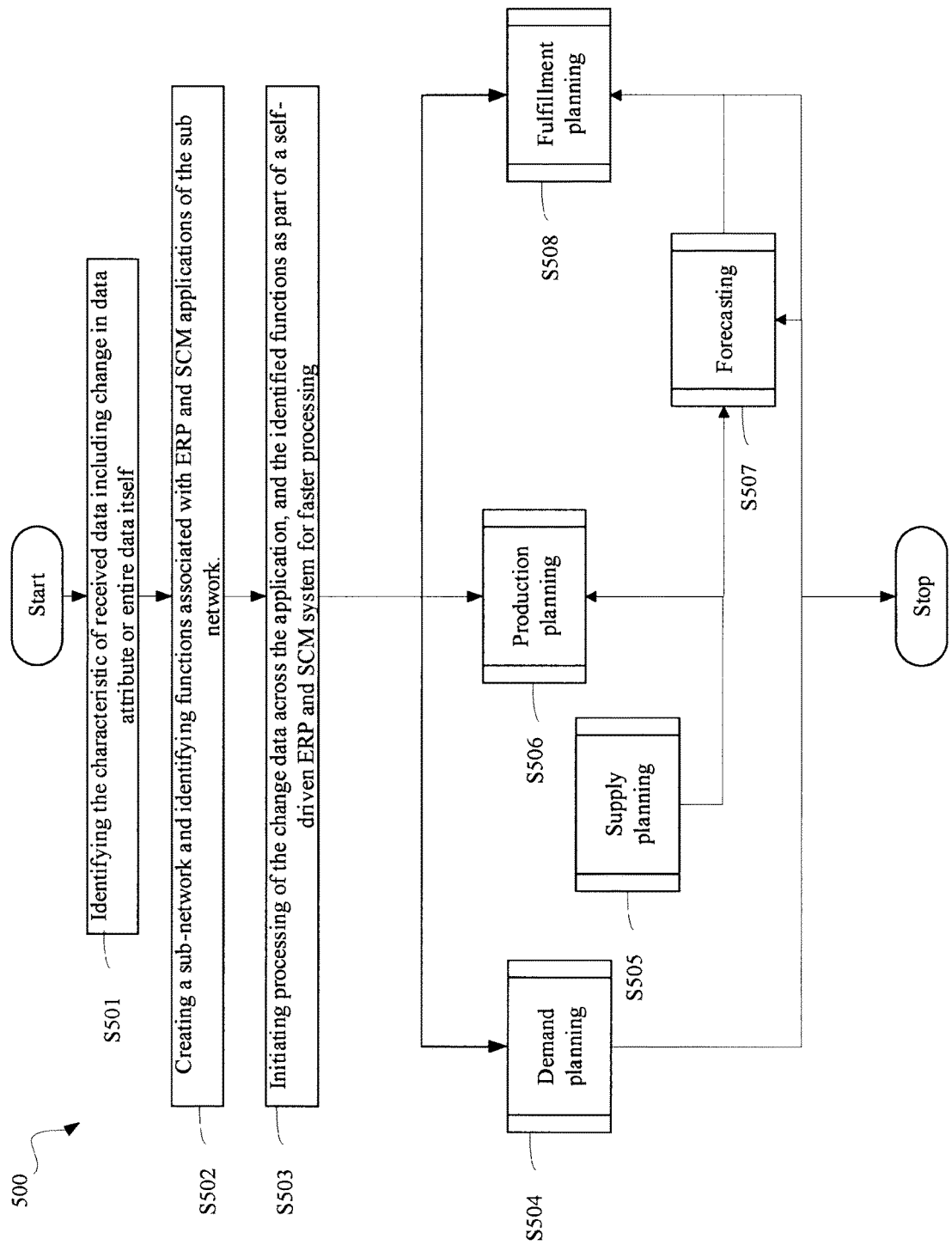
FIG. 5 is a view of is a flowchart depicting a method of operating on ERP and SCM applications with integrated functions and sub-network components in accordance with an embodiment of the invention.

In an example embodiment, the complexity involved in execution of various supply chain management (SCM) and ERP operations require systems and methods that process these operations in reduced timelines with accuracy. Various operations like procurement, inventory management, distribution and warehousing etc., when executed in an integrated manner, do not merely perform the functions that each operation would perform separately. Also, the changes in attribute of data received at the data lake are subject to processing by data models to determine impact data related to impact of the change on the functions of one or more applications to achieve accuracy of data, reduced error and faster processing times, for example, during ERP operation. Consider, for example, SCM or ERP with demand planning, supply planning, production planning, fulfillment planning, and forecasting as functions in ERP and SCM applications as shown in FIG. 5. The bot and AI in a non-limiting example of the present invention creates data models and scripts that are novel in integrating various steps of these functions by analyzing changes in data or data attributes received in the data lake to process the operation faster. Also, determining impact of the change in data on these functions enables faster processing with accuracy, more so, because combining two or more such functions leads to performance of another function i.e the combination of functions contributes towards performance of another function. In the above example, depicted by the flowchart 500, in S501 identifying the characteristic of received data including change in data attribute or entire data itself. In S502, a sub-network is created, and functions associated with ERP and SCM applications of the sub network are identified. In S503, processing of the changed data across the application, and the identified functions as part of a self-driven ERP and SCM system for faster processing is initiated. Consider some of the functions as sub processes demand planning in S504, supply planning in S505, production planning in S506, forecasting in S507 and fulfillment planning in S508. Consider the data received at the data lake related to a product or item that moves through the ERP and SCM applications. Demand planning S504 allows determination of a demand for the item or product considering various factors like customer base, consumption, density of population is a geographic location etc. Supply planning in S505 determines actions to fulfill the requirements created from the demand planning with an objective to balance supply and demand in manner that achieves desired objectives of ERP. Production planning S506 enables computation based on availability of items and capacities to meet customer demand by balancing the load on the manufacturing resources after considering the high throughput capacity of a plant. Forecasting S507 determines estimate for demand of item, supply of item, and production of the item. Fulfillment planning S508 ensures receiving of the item, packaging and shipping for eventual fulfillment of the order. Any change in characteristic of data or attributes related to the item/product will affect all the processes in different manner. In case, the change is not reflected at any of the functions, it shall lead to error and inaccuracy in that function. In case of combining of the functions like demand planning and supply planning for fulfillment of order, certain factors are considered related to characteristic of the item itself. When these functions act independently, the supply planning may not consider the change in the item characteristic. Also, during the Production planning S506, a user may wish to restrict the material composition of the item based on the demand of the item S504, thereby saving time on manufacturing items with undesired material characteristics. When functioning independently, these functions do not consider the changes in other functions of the SCM and ERP. These functions are integrated to perform another function of fulfillment planning S508. The bot considers all these changes for automatically creating scripts and remodeling or recalibrating functions recommend actions/tasks to a user. Also, it increases accuracy and reduces the time required for processing any function or combination thereof.

In an advantageous aspect, the system includes complete EA and SCM capabilities including Real time demand planning form outside to inside (using external and historical data sources), Production and Inventory Planning Using demand, production and supplier data sources; Supply planning based on connecting real time demand with suppliers, Warehousing planning and optimization of warehouse spaces for productivity and safety; Logistics planning with full optimization capability based on demand, suppler and network route data. The system has full operational capability where different users can come and conduct their workflows, approvals and issue work orders, purchase orders, requisitions, etc. They will also be able to receive invoices, receipt orders from their suppliers (both Tier 1 and Tier II) suppliers.

Exemplary embodiments of the present invention, may be a system, a method, and/or a computer program product. The computer program product may include a computer readable storage medium (or media) having computer readable program instructions thereon for causing a processor to carry out aspects of the present invention including but not limited to processing prediction algorithm, determining optimization characteristics based on performance data etc. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device, for example, it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A self-driven system configured to operate one or more applications, the self-driven system comprising:
   a datalake having
      a plurality of relational and non-relational databases configured for storing a plurality of structured and unstructured data received from distinct sources in real-time, wherein a characteristic of at least one attribute of one or more of the plurality of received data is determined as a change in the at least one attribute or determination of the at least one attribute as a new attribute,
      at least one functional database storing a library of functions utilized for performing a plurality of functions of the one or more applications wherein a plurality of data models generated by a controller performs the functions in real-time,
      at least one data model database configured for storing the plurality of data models; and
   a processor, wherein in response to determination of the at least one attribute as a new attribute, the processor
      determines the one or more applications utilizing the received data from the distinct sources,
      re-calibrates or remodels data models associated with the one or more applications based on the new attribute in the data lake wherein the plurality of data models are re-calibrated or re-modeled based on a predicted impact of characteristic of the at least one attribute of the stored data on the one or more applications, wherein the processor includes an AI based prediction and recommendation engine configured to recommend action/tasks.

2. The self-driven system of claim 1, wherein the processor is communicatively coupled to the data lake and the processor is further configured to:
   identify a plurality of data models to generate an impact data for predicting impact of the change on the one or more applications, in response to change in the at least one attribute wherein the plurality of data models is auto-selected based on the change;
   create at least one script by a bot based on the plurality of data models, the change in the at least one attribute, the impact data and AI based processing logic for recommending the action/task wherein a plurality of functions of the one or more applications are re-calibrated automatically in real-time based on the recommended action/task;
   determine the one or more applications utilizing the data from the distinct sources, in response to the determination of the attribute as a new attribute; and
re-calibrate or remodel the plurality of data models associated with the one or more applications based on the new attribute wherein the plurality of data models is re-calibrated based on predicted impact of the new attribute on the one or more applications.

3. The self-driven system of claim 2, wherein the plurality of distinct sources includes internet of things (IoT) device, demand from various sources at different levels like retailers, distribution channels, POS systems, customer feedback, supplier collaboration platform, invoices, purchase orders (PO), finance modules, inventory management module, contracts and RFx module, supplier module, item master, bill of materials, vendor master, warehouse management module, logistics management module, social media, weather, real time commodity and stock market prices, geo-political news.

4. The self-driven system of claim 3, wherein the data models include pro-active detection algorithms for detecting any record/transactions being entered by the user at a user interface, thereby ensuring a plurality of master tables of the data models are clean, accurate, complete and non-fraudulent/non-duplicate at any point in time and the data flowing through the one or more applications is clean and accurate.

5. The self-driven system of claim 4, wherein a data curator engine is configured to collect data from the distinct sources and act as a gateway to identify the at least one data attribute from the received data that is to be extracted as assessed from one or more applications.

6. The self-driven system data lake of claim 2, wherein the one or more applications include enterprise applications (EA) and supply chain management (SCM) applications.

7. The self-driven system of claim 6, wherein the enterprise applications include finance applications like automated billing applications and payment processing applications, Customer relationship management applications (CRM) and enterprise resource planning applications (ERP).

8. The self-driven system claim 7, wherein the EA and SCM applications include a plurality of nodes like inventory, logistics, warehouse, procurement, customers, supplier, retailers, distributors, resellers, co-packers and transportation wherein the nodes interact with each other to structure the plurality of functions associated with the applications.

9. The self-driven system of claim 1, wherein the plurality of functions includes demand planning, supply planning, production planning, forecasting, smart factory and fulfillment planning.

10. The self-driven system of claim 9, wherein the recommended task/action includes auto adjust data for the plurality of functions, risk mitigation, or direct interaction with the plurality of nodes.

11. The self-driven system of claim 1, further comprises a graph store with data relations analytics for providing real-time recommendation based on a historical data and relations wherein the graph store utilizes a graph store library to detect complex patterns and structures in the data model.

12. A system comprising:
a data lake configured to store a plurality of data from distinct sources in real-time wherein the data lake includes
a plurality of relational and non-relational databases configured for storing a plurality of structured and unstructured data received from distinct sources in real-time;
at least one functional database storing a library of functions utilized for performing a plurality of functions of the one or more applications wherein a plurality of data models generated by a controller performs the functions in real-time;
at least one data model database configured for storing the plurality of data models, wherein the data lake is configured to store re-calibrated or re-modelled data models associated with the one or more applications wherein the data models are re-calibrated based on a predicted impact of characteristic of at least one attribute of the stored data on the one or more applications wherein the characteristic of the at least one attribute includes change in the at least one attribute or determination of the attribute as a new attribute;
a control tower configured for controlling a plurality of functions associated with the one or more applications wherein the control tower determines characteristic of at least one attribute of one or more of the plurality of received data wherein characteristic includes change in the at least one attribute or determination of the attribute as a new attribute;
a controller encoded with instructions enabling the controller to function as a bot to generate a plurality of data models created for performing the plurality of functions by utilizing a library of functions stored on a functional database of the data lake; and
an AI based prediction and recommendation engine coupled to a processor configured for processing at least one prediction algorithm to generate at least one recommendation option in real time, wherein the processor communicatively coupled to the data lake is configured to:
identify the plurality of data models to generate an impact data for predicting impact of the change on the one or more applications, in response to change in the at least one attribute wherein the plurality of data models is auto-selected based on the change;
create at least one script by a bot based on the plurality of data models, the change in the at least one attribute, the impact data and AI based processing logic for recommending an action/task wherein a plurality of functions of the one or more applications are re-calibrated automatically in real-time based on the recommended action/task;
determine the one or more applications utilizing the data from the distinct sources, in response to determination of the attribute as a new attribute; and
re-calibrating or remodeling the plurality of data models associated with the one or more applications based on the new attribute wherein the plurality of data models is re-calibrated based on predicted impact of the new attribute on the one or more applications, wherein the AI based prediction and recommendation engine is configured to recommend the action/tasks.

13. The system of claim 12, wherein the impact data is determined by the data models for predicting impact of the change on the one or more applications wherein the data models are auto-selected based on the change.

14. The system of claim 13, wherein the TOT data includes sensor data on plant machinery, logistics carriers, security systems, warehouse cameras and sensors etc.

15. The system of claim 14, wherein the system is provided in a cloud or cloud-based computing environment.

16. The system of claim 14, wherein the data is a text data, a voice data, an image data or a combination thereof.

17. The system of claim 16, further comprises
a test module configured to test the plurality of data models and apply the tested data models to the one or more applications in real time wherein the tested models enables real time switching between the plurality of data models for different applications based on the functions and efficiency of the tested data models wherein the switching occurs in real time using AI based analysis of a performance data of the data models, the received data, and the functions related to the one or more applications.

18. The system of claim 17, wherein the one or more applications include enterprise applications (EA) and supply chain management (SCM) applications wherein the EA and SCM applications include a plurality of nodes like inventory, logistics, warehouse, procurement, customers, supplier, retailers, distributors, resellers, co-packers and transportation wherein the nodes interact with each other to structure the plurality of functions associated with the applications.

19. The system of claim 18, wherein the recommended task/action includes auto adjust data for the plurality of functions, risk mitigation, or direct interaction with the plurality of nodes.

20. The system of claim 19, further comprises interconnected data across the plurality of functions connecting demand with supply by combining customer and supplier data in real time and thereby structuring a collaborative platform for multiple entities like supplier, customer, factories and warehouses.

21. A computer program product for operating one or more application of a computing device with memory, the product comprising:
a non-transitory computer readable storage medium readable by a processor and storing instructions for execution by the processor for performing a method, the method comprising:
storing a plurality of data from distinct data sources in a data lake in real time, wherein the data lake includes:
a plurality of relational and non-relational databases configured for storing a plurality of structured and unstructured data received from distinct sources in real-time;
at least one functional database storing a library of functions utilized for performing a plurality of functions of the one or more applications wherein a plurality of data models generated by a controller performs the functions in real-time;
at least one data model database configured for storing the plurality of data models, wherein the data lake is configured to store re-calibrated or re-modelled data models associated with the one or more applications wherein the data models are re-calibrated based on a predicted impact of characteristic of at least one attribute of the stored data on the one or more applications wherein the characteristic of the at least one attribute includes change in the at least one attribute or determination of the attribute as a new attribute;
identifying the plurality of data models to generate an impact data for predicting impact of change on the one or more applications, in response to change in at least one attribute wherein the plurality of data models is auto-selected based on the change;
creating at least one script by a bot based on the plurality of data models, the change in the at least one attribute, the impact data and AI based processing logic for recommending an action/task wherein a plurality of functions of the one or more applications are re-calibrated automatically in real-time based on the recommended action/task;
determining the one or more applications utilizing the data from the distinct sources, in response to determination of the attribute as a new attribute; and
re-calibrating or remodeling the plurality of data models associated with the one or more applications based on the new attribute wherein the plurality of data models is re-calibrated based on predicted impact of the new attribute on the one or more applications, wherein an AI based prediction and recommendation engine is configured to recommend the action/tasks.

* * * * *